(12) United States Patent
Miller

(10) Patent No.: US 10,391,011 B2
(45) Date of Patent: Aug. 27, 2019

(54) ADJUSTABLE SUPPORT POLE HANDLE

(71) Applicant: Stander Inc., Logan, UT (US)

(72) Inventor: F. Troy Miller, Logan, UT (US)

(73) Assignee: Stander Inc., Logan, UT (US)

( * ) Notice: Subject to any disclaimer, the term of this patent is extended or adjusted under 35 U.S.C. 154(b) by 0 days.

(21) Appl. No.: 15/800,925

(22) Filed: Nov. 1, 2017

(65) Prior Publication Data

US 2018/0116887 A1  May 3, 2018

Related U.S. Application Data

(60) Provisional application No. 62/416,480, filed on Nov. 2, 2016.

(51) Int. Cl.
*A61G 7/10* (2006.01)
*F16M 13/02* (2006.01)
*A61G 7/053* (2006.01)

(52) U.S. Cl.
CPC ......... *A61G 7/1038* (2013.01); *F16M 13/027* (2013.01); *A61G 7/053* (2013.01); *A61G 7/1019* (2013.01)

(58) Field of Classification Search
CPC ..... A61G 7/053; A61G 7/1019; F16M 13/027
USPC ........ 248/157, 158, 161, 404, 105, 407–430
See application file for complete search history.

(56) References Cited

U.S. PATENT DOCUMENTS

| 1,797,911 A | 3/1931 | Goenen et al. |
| 2,981,959 A * | 5/1961 | Burnham ............... A61G 7/053 5/282.1 |
| 3,018,898 A | 1/1962 | Frazelle |
| 3,114,154 A | 12/1963 | Laughlin |
| 3,327,310 A * | 6/1967 | Bethune ............... H01Q 1/1235 248/200.1 |
| 3,350,120 A * | 10/1967 | Hinrichs ................. E04G 25/04 211/105.6 |
| 3,519,293 A | 7/1970 | Smith et al. |
| 3,553,746 A * | 1/1971 | Seiger .................... A61G 7/053 135/67 |
| 3,606,402 A | 9/1971 | Medney |
| 3,822,850 A * | 7/1974 | Elias ................... E04G 21/3233 248/200.1 |
| D242,671 S | 12/1976 | Morton |

(Continued)

FOREIGN PATENT DOCUMENTS

| DE | 1805421 B | 7/1976 | |
| DE | 19840854 A1 * | 3/2000 | ............. A61G 7/053 |
| JP | 10234789 | 9/1998 | |

OTHER PUBLICATIONS

HealthCraft Dependa-Bar (installation instructions); HealthCraft Products Inc., Ottawa, Ontario, Canada, Copyright 2006. (3 pgs.) http://www.healthcraftproducts.com.

(Continued)

*Primary Examiner* — Eret C McNichols
(74) *Attorney, Agent, or Firm* — Stoel Rives LLP

(57) ABSTRACT

A support pole including a support member including a longitudinal axis, a floor mount on a first end of the support member, a ceiling mount on a second end opposite the first end of the support member; and at least one handle coupled to the support member. The handle is positionable 360 degrees about the support member and along the longitudinal axis between the first end and the second end.

20 Claims, 8 Drawing Sheets

(56) References Cited

U.S. PATENT DOCUMENTS

| | | |
|---|---|---|
| 4,101,036 A | 7/1978 | Craig |
| 4,238,164 A | 12/1980 | Mazzolla |
| 4,351,348 A | 9/1982 | Axton |
| 4,498,204 A | 2/1985 | Warner |
| 4,725,027 A | 2/1988 | Bekanich |
| 4,794,974 A * | 1/1989 | Melino .................. A47H 21/00 160/327 |
| 4,907,835 A * | 3/1990 | Salters ................... B60N 2/787 296/1.09 |
| 4,908,906 A | 3/1990 | Hanna |
| 4,928,916 A * | 5/1990 | Molloy ............... E04F 21/1805 248/354.1 |
| 4,932,090 A | 6/1990 | Johansson |
| 5,056,753 A | 10/1991 | Lunau et al. |
| 5,366,191 A | 11/1994 | Bekanich |
| 5,516,158 A | 5/1996 | Watts |
| 5,536,229 A * | 7/1996 | Albergo ........... A63B 21/00047 482/148 |
| 5,586,352 A | 12/1996 | O'Brien et al. |
| 5,711,555 A | 1/1998 | Leedy |
| 5,826,847 A | 10/1998 | Warner et al. |
| 5,876,147 A | 3/1999 | Longo |
| 5,897,085 A * | 4/1999 | Cronin ................... A61G 7/053 248/200.1 |
| 5,906,284 A | 5/1999 | Hammerstrom et al. |
| 5,979,854 A | 11/1999 | Lundgren et al. |
| 6,012,182 A | 1/2000 | Allen et al. |
| 6,027,987 A | 2/2000 | Yamazaki et al. |
| 6,068,225 A | 5/2000 | O'Brien et al. |
| 6,322,110 B1 | 11/2001 | Banker et al. |
| 6,381,772 B1 | 5/2002 | Dawson |
| 6,467,741 B1 * | 10/2002 | Shih ........................ E04G 25/06 248/200.1 |
| D470,581 S | 2/2003 | Hoernig |
| D474,281 S | 5/2003 | Hansen |
| 6,560,794 B2 | 5/2003 | Allen et al. |
| 6,745,785 B2 | 6/2004 | Kotovsky |
| 6,922,857 B2 | 8/2005 | Palma |
| 7,124,451 B2 | 10/2006 | Moore |
| 7,198,236 B2 | 4/2007 | Warner |
| D584,129 S | 1/2009 | Miller |
| 7,533,712 B2 | 5/2009 | Whittemore et al. |
| 7,658,219 B2 | 2/2010 | Whittmore |
| 7,849,564 B2 | 12/2010 | Miller |
| 7,874,881 B1 | 1/2011 | Sosa et al. |
| 8,137,243 B2 | 3/2012 | Coote |
| 8,827,587 B2 | 9/2014 | Didehvar |
| 8,875,774 B1 * | 11/2014 | Flores .................... E04G 21/30 160/351 |
| 8,919,387 B2 | 12/2014 | Martin |
| 8,973,899 B2 * | 3/2015 | Buckingham ......... E04G 25/061 254/105 |
| 9,200,732 B2 | 12/2015 | Coogan et al. |
| 9,339,901 B2 | 5/2016 | Miller |
| 9,663,962 B1 * | 5/2017 | Whittemore .......... E04G 21/243 |
| 2004/0194418 A1 * | 10/2004 | Gouley ................... E04G 17/14 52/831 |
| 2004/0217239 A1 * | 11/2004 | Chuang ............. A47B 96/1425 248/125.8 |
| 2009/0283360 A1 | 11/2009 | Eckerdt |
| 2015/0219272 A1 | 8/2015 | Miller |
| 2016/0184164 A1 * | 6/2016 | Browning ............ A63B 21/015 482/115 |

OTHER PUBLICATIONS

HealthCraft Dependa-Bar (website download); HealthCraft Products Inc., Ottawa, Ontario, Canada. (7 pgs) http://web.archive.org/web/20051030030453/http://www.healthcraftproducts.com/dependabar.htm (Oct. 30, 2005).

JDCSupplies, Guardian Safe-T-Pole, accessed May 24, 2016.

Mobility-Aids.com brochure, accessed May 24, 2016.

Non-Final Office Action dated Mar. 17, 2010 in U.S. Appl. No. 11/653,494.

Non-Final Office Action dated Sep. 11, 2015 in U.S. Appl. No. 14/174,679.

Notice of Allowance dated Aug. 3, 2010 in U.S. Appl. No. 11/653,494.

Notice of Allowance dated Feb. 17, 2016 in U.S. Appl. No. 14/174,679.

Notice of Allowance dated Sep. 8, 2008 in Design U.S. Appl. No. 29/303,281.

Stander Inc., Senior Home Care Safety Products, http://stander.com/products, accessed May 24, 2016.

* cited by examiner

ADJUSTABLE SUPPORT POLE HANDLE

RELATED APPLICATION

This application claims priority to U.S. Provisional Application No. 62/416,480 filed Nov. 2, 2016, titled ADJUSTABLE SUPPORT POLE HANDLE, which is herein incorporated by reference in its entirety.

TECHNICAL FIELD

The present disclosure relates generally to mobility assistance devices. More specifically, the present disclosure relates to an adjustable support pole handle that can be positioned on a support pole in any configuration, including any rotational position and any longitudinal position along the support pole.

BRIEF DESCRIPTION OF THE DRAWINGS

The embodiments disclosed herein will become more fully apparent from the following description and appended claims, taken in conjunction with the accompanying drawings. The drawings depict primarily generalized embodiments, which embodiments will be described with additional specificity and detail in connection with the drawings in which:

DETAILED DESCRIPTION

A support pole with a handle that may be positioned in any longitudinal or rotational position are described herein. It will be readily understood that the components of the embodiments as generally described below and illustrated in the figures herein could be arranged and designed in a wide variety of different configurations. Thus, the following more detailed description of various embodiments, as described below and represented in the figures, is not intended to limit the scope of the disclosure, but is merely representative of various embodiments. While the various aspects of the embodiments are presented in drawings, the drawings are not necessarily drawn to scale unless specifically indicated.

The phrases "operably connected to," "connected to," and "coupled to" refer to any form of interaction between two or more entities, including mechanical, electrical, magnetic, electromagnetic, fluid, and thermal interaction. Two entities may interact with each other even though they are not in direct contact with each other. For example, two entities may interact with each other through an intermediate entity, unless specified as directly interacting.

The figures illustrate one embodiment of a support pole 100. The support pole 100 comprises various components and materials as further detailed below.

Figure 1:
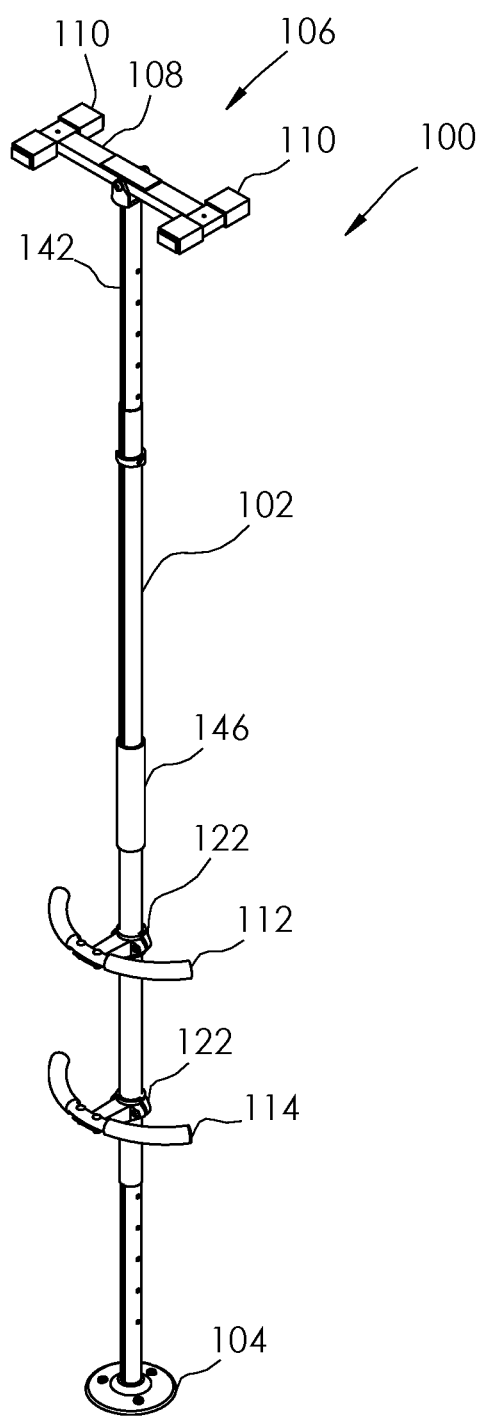
FIG. 1 illustrates a perspective view of one embodiment of a support pole shown with positionable handles.

FIG. 1 illustrates an embodiment of a mobility assistance device 100 as shown from a perspective view. The mobility assistance device 100 includes a supporting member such as a support pole 102. A base plate 104 may be situated at one end of the support pole 102 for mounting to a floor. Mounting to a floor may include placement on a ground surface, or another base surface, such as the side of a bathtub, a shelf or similar surface that might be raised from the ground. The base plate 104 provides surface area for the support pole 102 to be stable when installing and in use. The terms "mounting" or "mounted" are not restricted to the use of fasteners, but may also encompass positioning and/or securing of the support pole 102 in a useful configuration.

A brace 106 may be situated at the opposite end of the support pole 102 from the base plate 104. The brace 106 may comprise a support beam 108 and cross members 110 to facilitate mounting to a ceiling. In the embodiment depicted, the support beam 108 and cross members 110 are arranged in a capital "I" configuration. Fasteners may optionally be used to mount the brace 106 to a ceiling.

The mobility assistance device 100 may include at least one handle, such as handles 112, 114. In the embodiment shown, the handles 112, 114 are curved or arc shaped. However, the handles 112, 114 may be any shape suitable for a handle. Further, although two handles 112, 114 are shown in FIGS. 1-8, any number of handles may be used, including a singular handle.

Figure 2:
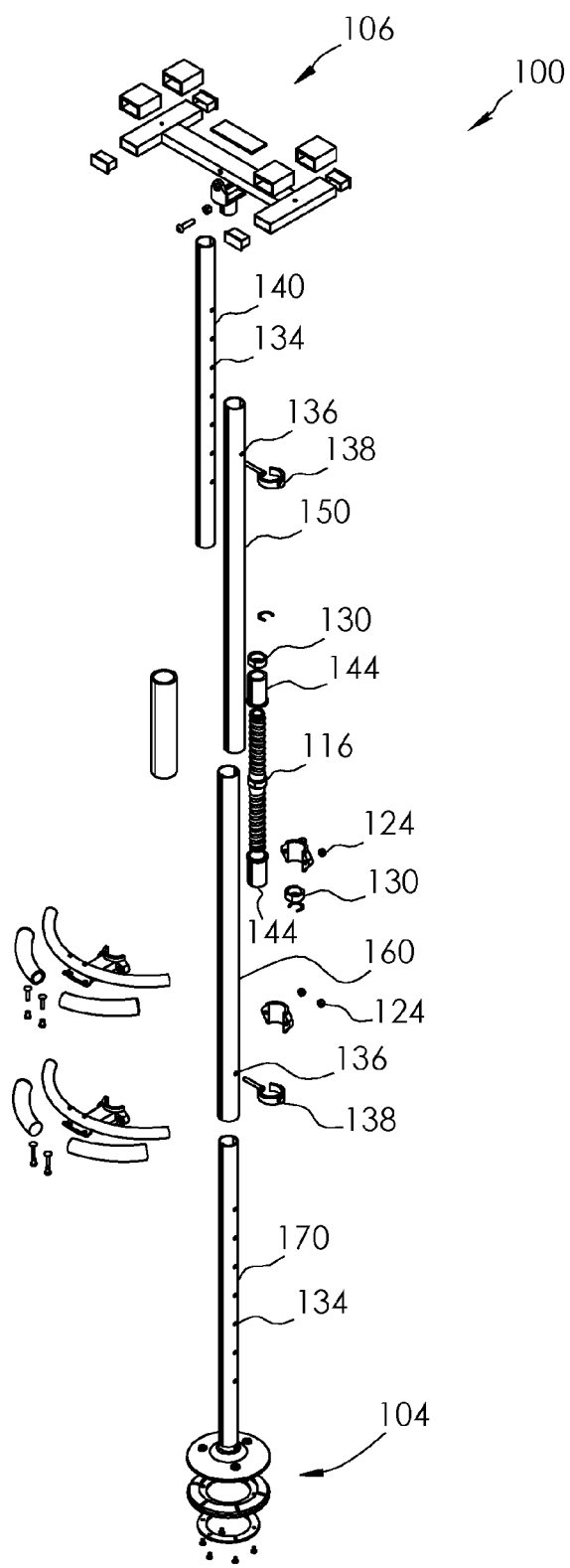
FIG. 2 illustrates an unassembled or exploded view of the embodiment of FIG. 1.
Figure 3:
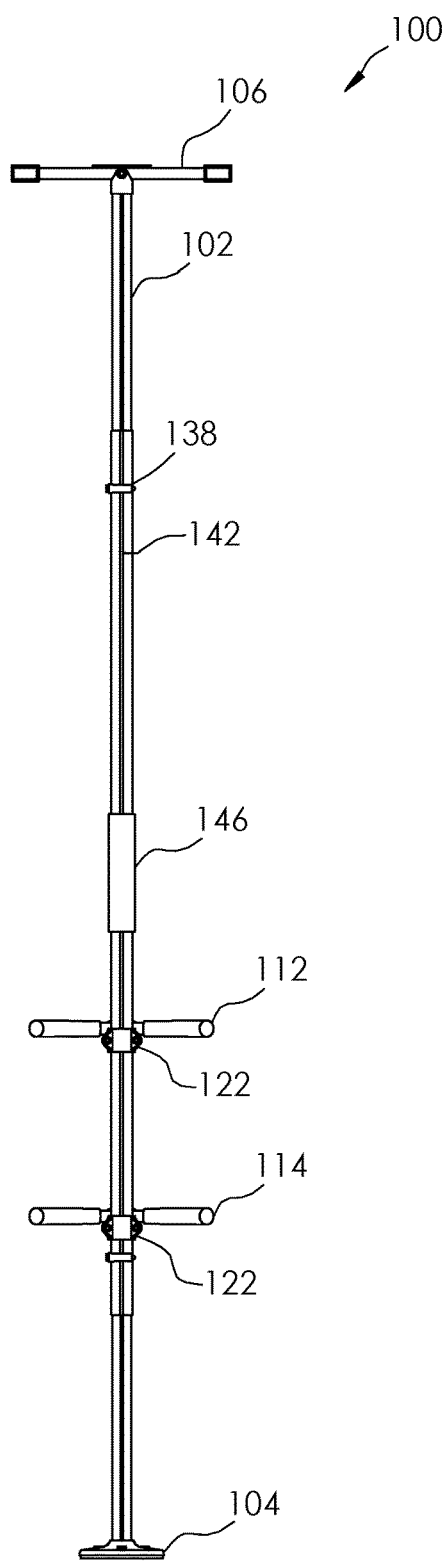
FIG. 3 illustrates a front view of the embodiment of FIG. 1.
Figure 4:
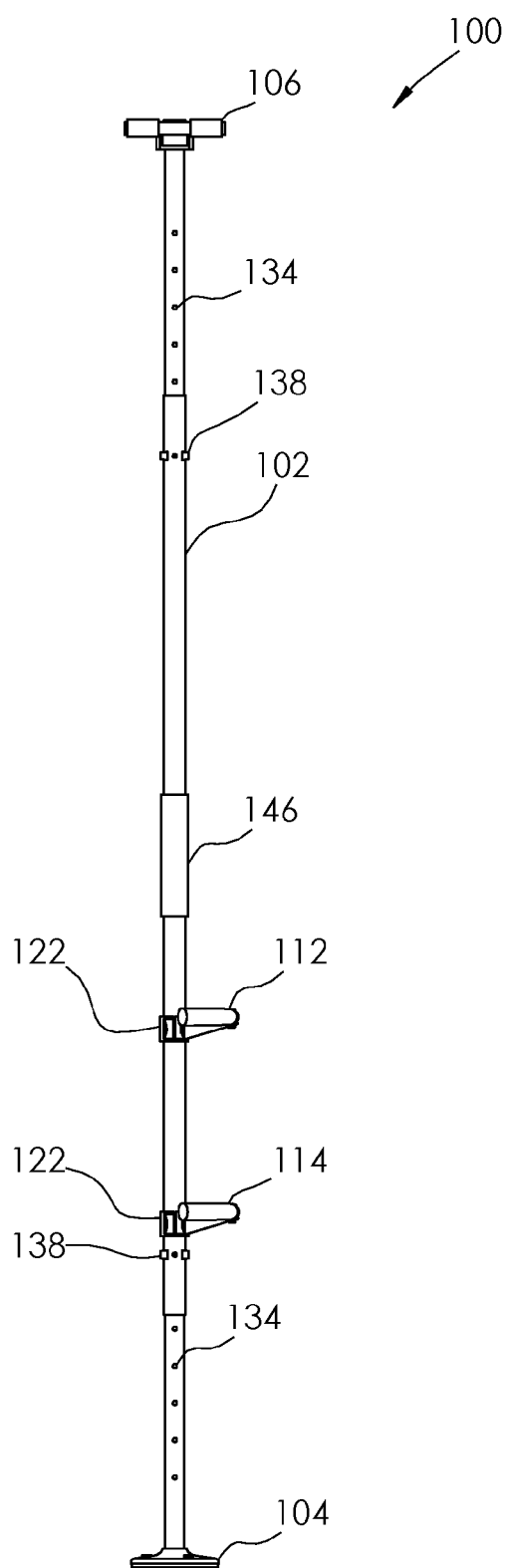
FIG. 4 illustrates a side view of the embodiment of FIG. 1.
Figure 5:
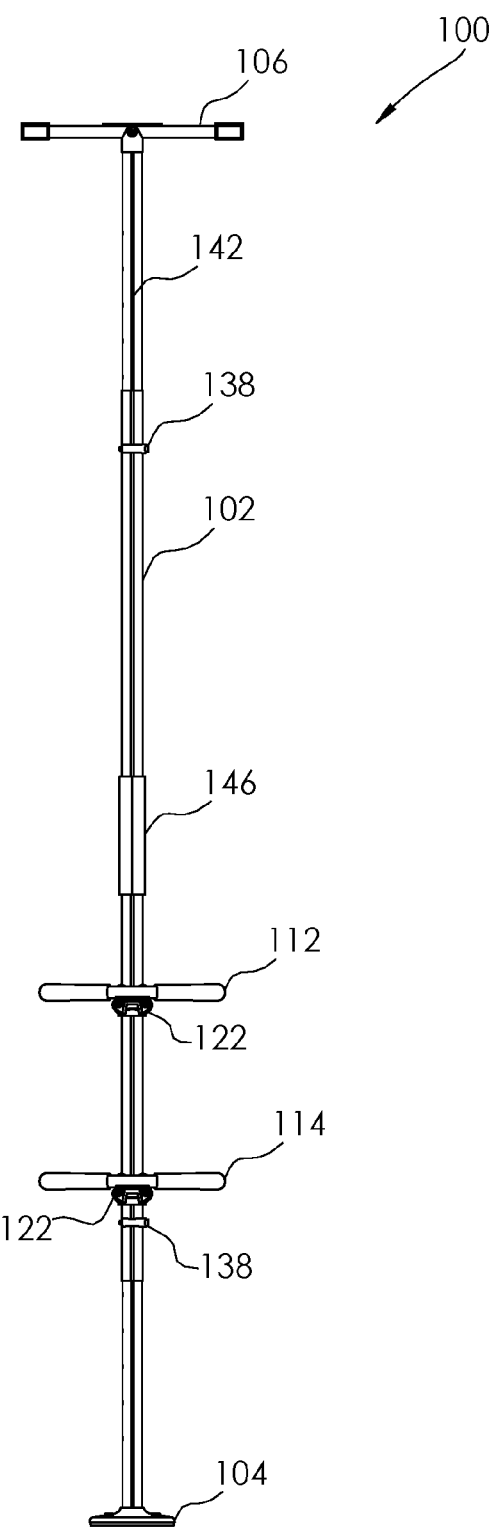
FIG. 5 illustrates a back view of the embodiment of FIG. 1.
Figure 6:
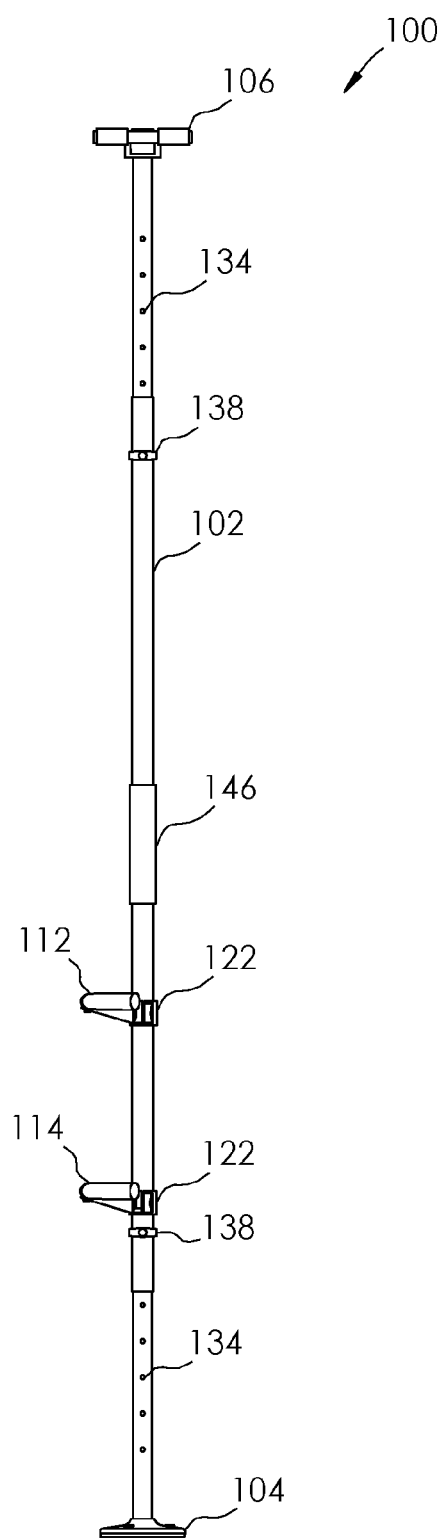
FIG. 6 illustrates another side view of the embodiment of FIG. 1.
Figure 7:
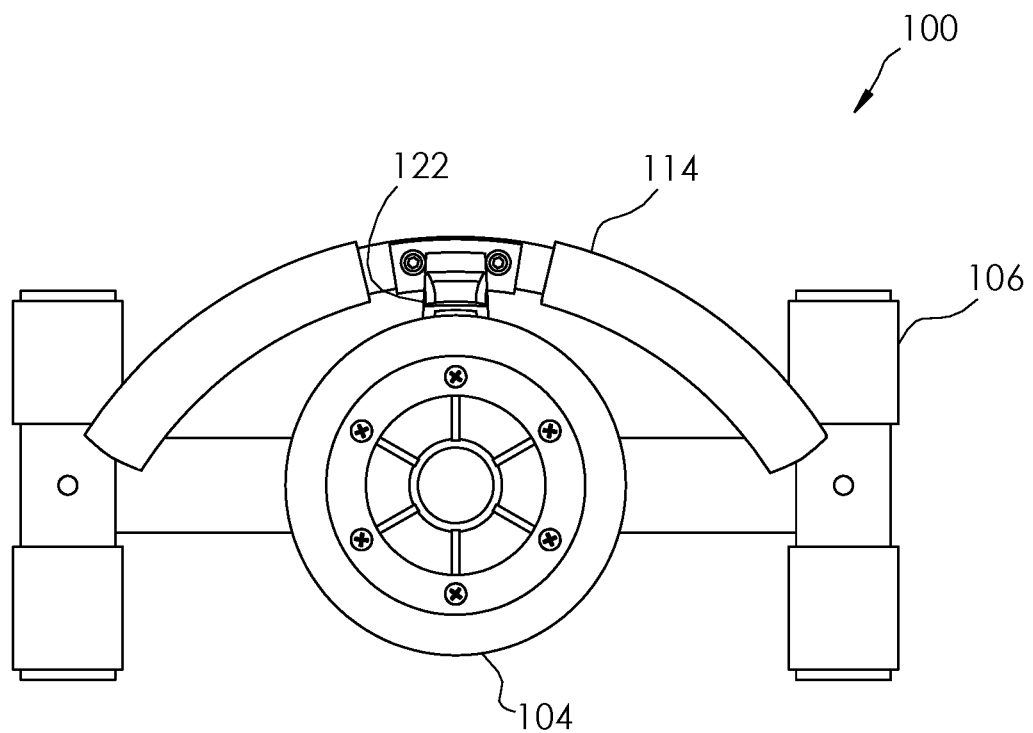
FIG. 7 illustrates a bottom view of the embodiment of FIG. 1.
Figure 8:
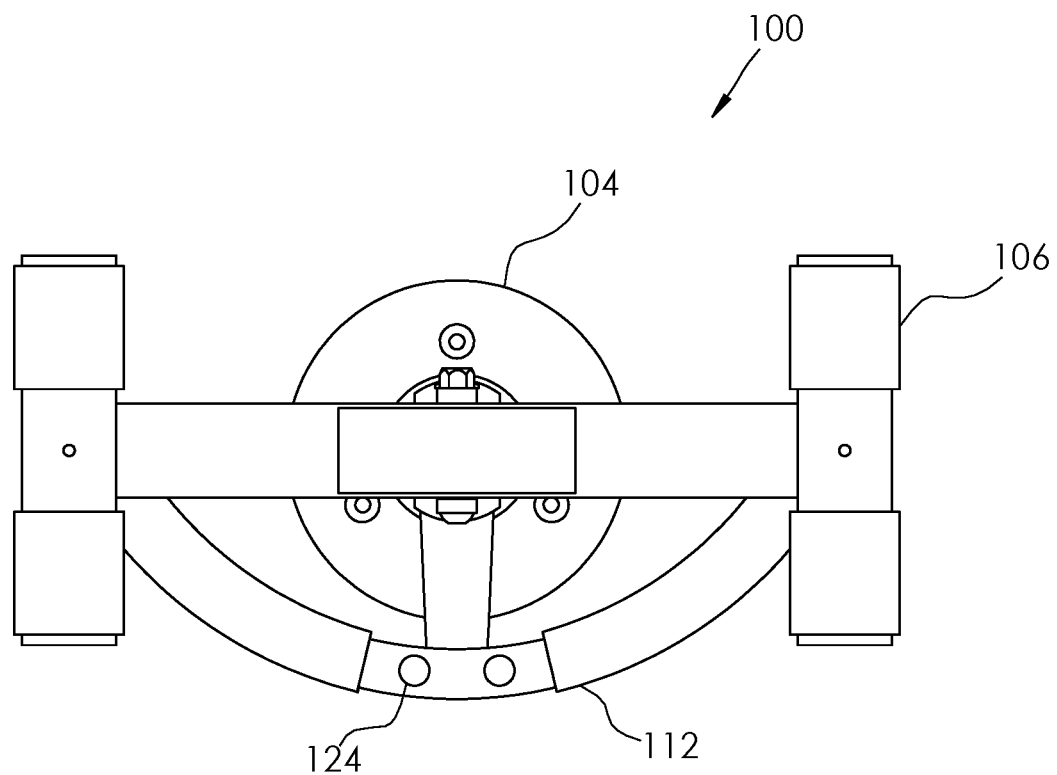
FIG. 8 illustrates a top view of the embodiment of FIG. 1.

Referring to FIG. 2 mobility assistance device 100 is shown from an exploded perspective view. As described above, the mobility assistance device 100 includes the support pole 102 extending between the floor and ceiling. The base plate 104 is located at one end of the support pole 102 and the ceiling brace 106 is located at the other end. The base plate 104 and the brace 106 may be coupled to the support pole 102 via fasteners 118. The support pole 102 also includes a height adjustment component 116 to extend the height of the support pole 102. Alternatively sized height extension pieces 116 may be used as would be appreciated by those having skill in the art with the aid of the present disclosure.

The handles 112, 114 each independently attach to brackets 122 via fasteners 124. The brackets 122 each independently attach the handles 112, 114 to the support pole 102 via fasteners 126. In some embodiments, each of the handles 112, 114 includes handle grips 128 to allow a user to comfortably grasp the handles 112, 114.

The handles 112, 114 are each pivotally and rotatably coupled to the support pole 102 along a common axis. The handles 112, 114 may be mounted at any desired (i.e., indiscrete) longitudinal or rotational position on the support pole 102 by loosening the fasteners 126 and placing either handle 112, 114 in the desired position on the support pole 102 and retightening the fasteners 126. That is, handles 112, 114 each independently have infinite longitudinal and rotational displacement along the support pole 102. The handles 112, 114 may be positioned 360 degrees around the support pole 102 and at any longitudinal position between the base plate 104 and the ceiling brace 106.

The support pole 102 may comprise a single unit, or alternatively, as shown in FIGS. 1-8, the support pole 102 may comprise several pole portions that are coupled together to form mobility assistance device 100. For example, the support pole 102 may comprise support pole portions 140, 150, 160, and 170, shown in FIG. 2. The support pole portions 140, 150, 160, and 170 may be similar or different lengths. Each of support pole portions 140, 150, 160, and 170 are hollow. Support pole portions 140 and 170 may have a smaller diameter to fit within the support pole portions 150 and 160, respectively. Although FIGS. 1-8 show four support pole portions, any number of support pole portions may be used, as would be appreciated by those having skill in the art with the aid of the present disclosure.

As mentioned above, the mobility assistance device 100 may further include the height adjustment component 116 to allow a user to alter the height of support pole 102 to account for different heights between the floor and ceiling in various environments.

The height adjustment component 116 may include male threaded ends extending in opposite directions from a center portion of the height adjustment component 116. A nut 130 may be threaded onto each end of the height adjustment component 116 to set a desired height of the support pole 102. A support 144 is provided on each end of the height adjustment as well, with a lip that is the same or a greater diameter than the support portions 150 and 160. The male threaded ends are sized to fit within the support pole portions 150 and 160. For the male threaded end that fits within the support pole portion 150, a nut 130 may be threaded onto the height adjustment component so that the support pole portion 150 abuts against the lip of the support 144.

For the male threaded end that fits within the support pole portion 160, the support 144 is placed on the male threaded end prior to the nut 130. This allows the nut 130 to set the desired height, and the support pole portion 160 abuts against the lip of the height cap 144.

The height adjustment component 116 is able to provide fine adjustments to adjust the height of the support pole 102. A cover 146 may also be provided that has a greater diameter than the support portions 150 and 160 to cover the height adjustment component 116. When a user desires to adjust the height of the support pole 102, the height adjustment component 116 is accessed at its midpoint and rotated. This causes male threaded ends to turn with respect to the nuts 130, which in turn causes the height of the support pole 102 to expand or contract. This configuration permits rapid height adjustment (at twice the thread distance) because threads exist on both ends of the height adjustment component 116, and rotation thereof causes rotation on both ends with respect to their engaged nuts 130.

Furthermore, alternative height adjustment components may be used as would be appreciated by those having skill in the art with the aid of the present disclosure, such as a telescoping pole arrangement with a locking nut that screws down on flexible fingers to the desired height.

In addition to the height adjustment component 116 to provide fine adjustments to the height of the support pole 102, the support portions 140 and 170 may be provided with discrete holes 134 to provide coarse adjustment of the height of support pole 102. Support portions 150 and 160 each contain a hole 136. Hole 136 is aligned with a desired discrete hole 134 and pin 138 is inputted in both holes to set a coarse adjustment in height of the support pole 102 before making a fine adjustment via the height adjustment component 116.

The support pole 102 may also contain at least one groove 142. The groove 142 prevents the support pole portions 140, 150, 160, and 170 from rotating relative to each other when assembled, as shown in FIGS. 1-3 and 5. The support pole portions 140, 150, 160, and 170 are assembled so that the grooves 142 line up on a singular axis. As seen in FIGS. 1-3 and 5, the groves 142 may be provided on opposite sides of the support pole 102 to prevent the support pole portions 140, 150, 160, and 170 from rotating relative to each other when a user either grabs the support pole 102 or the handles 112, 114, or when a user changes the rotational or longitudinal position of the handles 112, 114.

Without further elaboration, it is believed that one skilled in the art can use the preceding description to utilize the present disclosure to its fullest extent. The examples and embodiments disclosed herein are to be construed as merely illustrative and exemplary and not a limitation of the scope of the present disclosure in any way. It will be apparent to those having skill in the art, and having the benefit of this disclosure, that changes may be made to the details of the above-described embodiments without departing from the underlying principles of the disclosure herein.

The invention claimed is:

1. A support pole, comprising:
    a support member comprising a longitudinal axis, a first support portion, and a second support portion, wherein the first support portion and the second support portion comprise an external groove that extends along the longitudinal axis and aligns when the support portions are assembled to inhibit rotational displacement of each support portion relative to each other;
    a floor mount coupled to a first end of the support member;
    a ceiling mount coupled to a second end opposite the first end of the support member;
    a height adjustment component coupled to support member, wherein the height adjustment component is configured to adjust a length of the support member between the first end and the second end, wherein the height adjustment component is disposed between the first support portion and the second support portion, wherein the height adjustment component comprises a first threaded portion and a second threaded portion, wherein the first threaded portion is coupled to the first support portion and the second threaded portion is coupled to the second support portion; and
    a handle coupled to the support member, wherein the handle is positionable 360 degrees about the support member and along the longitudinal axis between the first end and the second end.

2. The support pole of claim 1, further comprising a first nut, a second nut, a first support, and a second support, wherein the first nut and the first support are threadedly coupled to the first threaded portion and the second nut and the second support are threadedly coupled to the second threaded portion to set a position of the first support portion and the second support portion, wherein a lip of the first support and the second support have a diameter that is the same or greater than the diameter of the first support portion and the second support portion, and wherein the first support is coupled to the first threaded portion before the first nut and the second support is coupled to the second threaded portion before the second nut.

3. The support pole of claim 2, wherein rotation of the adjustment component causes the first and second threaded portions to rotate with respect to the first nut and the second nut simultaneously.

4. The support pole of claim 2, wherein rotation of the adjustment component causes the first support portion and the second support portion to be axially adjusted in opposite directions simultaneously.

5. The support pole of claim 1, wherein the ceiling mount comprises a support beam and at least one cross member.

6. The support pole of claim 1, further comprising a second handle, wherein the second handle is positionable 360 degrees about the support member and along the longitudinal axis between the first end and the second end.

7. The support pole of claim 1, wherein the handle is configured in a curved or an arc shape.

8. The support pole of claim 1, wherein the height adjustment component is configured to provide fine adjustment to the support pole height, and wherein a secondary height adjustment component is configured to provide coarse adjustment to the support pole height.

9. The support pole of claim 1, wherein the first support portion comprises a plurality of apertures disposed along the longitudinal axis,
wherein the support member further comprises a third support portion that comprises an aperture,
wherein the third support portion is configured to couple to the first support portion via a first pin that is inserted through the aperture of the third support portion and one of the plurality of apertures of the first support portion, and
wherein the height of the support member is adjustable when the pin is inserted into a different aperture of the plurality of apertures of the first support portion.

10. The support pole of claim 9, wherein the second support portion comprises a plurality of apertures disposed along the longitudinal axis,
wherein the support member further comprises a fourth support portion that comprises an aperture,
wherein the fourth support portion is configured to couple to the second support portion via a second pin that is inserted through the aperture of the fourth support portion and one of the plurality of apertures of the second support portion, and
wherein the height of the support member is adjustable when the pin is inserted into a different aperture of the plurality of apertures of the first support portion.

11. A support pole comprising:
a support member comprising a longitudinal axis, a first support portion and a second support portion, wherein the first support portion and the second support portion comprise an external groove that extends along the longitudinal axis and aligns when the support portions are assembled to inhibit rotational displacement of each support portion relative to each other;
a floor mount coupled to a first end of the support member;
a ceiling mount coupled to a second end opposite the first end of the support member; and
a first handle coupled to the support member, wherein the handle is positionable on the support member in indiscrete rotational and longitudinal positions.

12. The support pole of claim 11, further comprising a second handle coupled to the support member below the first handle, the second handle positionable on the support member in indiscrete rotational and longitudinal positions.

13. The support pole of claim 12, wherein the first handle and the second handle are configured in a curved or arc shape.

14. The support pole of claim 11, further comprising a height adjustment component disposed within the support member, the height adjustment component capable of adjusting a length of the support member between the first end and the second end.

15. The support pole of claim 14, wherein the height adjustment component is disposed between the first portion and the second portion.

16. The support pole of claim 15, wherein the height adjustment component comprises a first threaded portion and a second threaded portion, wherein the first threaded portion is coupled to the first support portion and the second threaded portion coupled to the second support portion.

17. The support pole of claim 16, further comprising a first nut, a second nut, a first support, and a second support, wherein the first nut and the first support are threadedly coupled to the first threaded portion and the second nut and the second support are threadedly coupled to the second threaded portion to set a position of the first support portion and the second support portion, wherein rotation of the adjustment component causes the first and second threaded portions to rotate with respect to the first nut and the second nut simultaneously, wherein a lip of the first support and the second support have a diameter that is the same or greater than the diameter of the first support portion and the second support portion, and wherein the first support is coupled to the first threaded portion before the first nut and the second support is coupled to the second threaded portion before the second nut.

18. The support pole of claim 17, wherein rotation of the adjustment component causes the first support portion and the second support portion to be axially adjusted in opposite directions simultaneously.

19. The support pole of claim 11, wherein the support member comprises a plurality of support portions, wherein each support portion comprises a groove that aligns when the support portions are assembled to inhibit rotational displacement of each support portion relative to each other.

20. The support pole of claim 11, wherein the ceiling mount comprises a support beam and at least one cross member.

* * * * *

UNITED STATES PATENT AND TRADEMARK OFFICE
CERTIFICATE OF CORRECTION

PATENT NO. : 10,391,011 B2
APPLICATION NO. : 15/800925
DATED : August 27, 2019
INVENTOR(S) : F. Troy Miller Page 1 of 1

It is certified that error appears in the above-identified patent and that said Letters Patent is hereby corrected as shown below:

In the Specification

Column 3, Line 67 reads, ". . . the groves . . ." which should read, ". . . the grooves . . ."

In the Claims

Column 4, Line 30 reads, ". . . coupled to support . . ." which should read, ". . . coupled to the support . . ."

Signed and Sealed this
Eighth Day of October, 2019

Andrei Iancu
*Director of the United States Patent and Trademark Office*